E. R. RICHARDS.
GRIPPING DEVICE.
APPLICATION FILED SEPT. 26, 1910.

1,048,585.

Patented Dec. 31, 1912.

WITNESSES;
J. C. Devick.
C. Paul Parker.

INVENTOR
Ernst R. Richards
By Luther L. Miller
ATTORNEY

UNITED STATES PATENT OFFICE.

ERNST R. RICHARDS, OF CHICAGO, ILLINOIS, ASSIGNOR TO SEARS, ROEBUCK AND CO., OF CHICAGO, ILLINOIS, A CORPORATION OF NEW YORK.

GRIPPING DEVICE.

1,048,585.  Specification of Letters Patent.  Patented Dec. 31, 1912.

Application filed September 26, 1910. Serial No. 583,847.

*To all whom it may concern:*

Be it known that I, ERNST R. RICHARDS, a citizen of the United States, residing at Chicago, in the county of Cook and State of Illinois, have invented certain new and useful Improvements in Gripping Devices, of which the following is a specification.

This invention relates to an automatic gripping device adapted to be inserted into the interior of a body for gripping said body so that it may be hoisted, or for any other desired purpose.

The device is especially adapted for use in hoisting rolls of paper, or the like, which are wound on tubes of metal or other hard material, the device being inserted in one end of the tube.

One object of the invention is to produce a gripping device of the character set forth which is simple in construction and very strong.

Another object is to produce a gripping device in which the parts automatically assume their gripping position when the device is associated with the body to be moved.

Another object is to produce a gripping device in which the strength of the gripping action varies proportionately with the resistance offered by the body to be moved.

Other objects and advantages will be apparent from the detailed description hereafter set forth.

Figure 1:
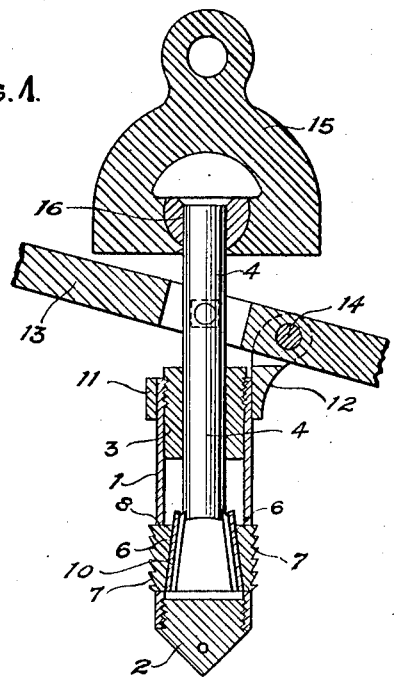
Figure 3:
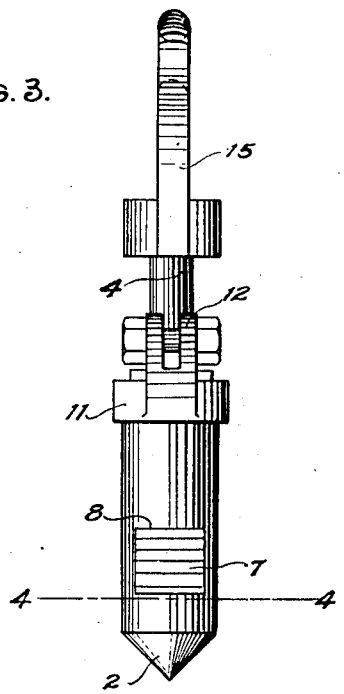
Figure 2:
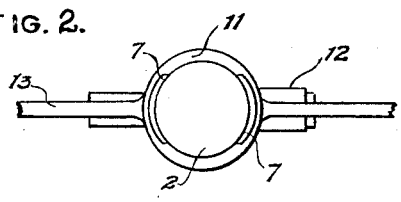
Figure 4:
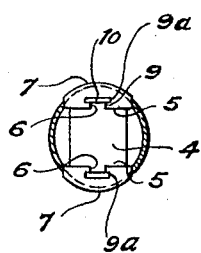

In the accompanying drawings, Figure 1 is the longitudinal central section through a gripping device embodying the features of my invention. Fig. 2 is a bottom plan view thereof. Fig. 3 is a side elevation, and Fig. 4 is a section on line 4 4 of Fig. 3.

The embodiment of the invention which is herein shown comprises a sleeve 1 having its lower end closed by a screw-threaded tapering plug 2, and having an annular plug 3 threaded in its upper end. A rod 4 is slidably mounted in the plug 3, the lower end of said rod lying within the sleeve 1 between plugs 2 and 3. Said lower end of the rod 4 has wedging surfaces 5 thereon, said wedging surfaces in this instance having longitudinal ribs 6. A plurality of jaws 7, in the present instance two in number, lie in openings 8 in opposite sides of the sleeve 1, the inner sides of said jaws being inclined to engage the wedging surfaces 5 on the rod 4, said inner faces of the jaws 7 having grooves 9 therein in which the ribs 6 travel. Keys 10 fixed to the ribs 6 are adapted to fit in under-cut portions 9ª of the grooves 9 to hold the jaws 7 in contact with the wedging surfaces 5 upon the rod 4. It will be observed that relative sliding movement between the rod 4 and the sleeve 1 will result in moving the jaws 7 inwardly or outwardly, depending upon the direction of such movement. The outer faces of the jaws 7 are curved to conform to the interior of the paper-roll tubes, said outer faces having teeth formed therein to more effectively grip said tube.

Fixed to the upper end of the sleeve 1 is a ring 11 having a pair of ears 12 thereon. A lever 13 is pivoted upon the upper portion of the rod 4 and is connected with the sleeve 1 by means of a pin 14 passing through the ears 12 and said lever, for the purpose of sliding the sleeve 1 and its attached parts with relation to the rod 4 to retract the jaws 7.

A member 15 which is adapted to have a hoisting cable attached thereto is connected with the upper end of the rod 4, in the present instance by means of a universal connection consisting of a ball 16 rotatably mounted in the lower portion of the member 15, the rod 4 passing upwardly through the lower portion of the member 15 and the ball 16, and having its upper end suitably secured to said ball. As will be observed, this connection permits of relative swinging and rotary movement between the rod 4 and the member 15.

In use, the lever 13 is swung to raise the sleeve 1 upon the rod 4 so as to carry the jaws 7 inwardly, and the sleeve 1 is then inserted in the upper end of the tube of the roll of paper to be lifted. When the lever 13 is released the sleeve 1 will move by gravity upon the rod 4 and thus carry the jaws 7 into engagement with the interior of the paper-roll tube. When the gripping device is raised by means of a hoist or other suitable mechanism, the weight of the roll of paper acting upon the jaws 7 will tend to draw said jaws downwardly. This downward movement of the jaws 7 will cause said jaws to be spread apart owing to the wedging surfaces 5 on the rod 4, so that said jaws will grip the paper-roll tube with a force proportionate to the weight of the roll. When the load has been transported to the point desired, the lever 13 is moved to carry the sleeve 1 upwardly, thus withdrawing the jaws 7 from their gripping engagement with the tube and permitting the device to be withdrawn therefrom.

It will be seen that the device herein disclosed is very simple and very strong, and that in use the portion which lies at the outside of the roll of paper takes up very little space. The rolls may therefore be piled upon each other in tiers of a maximum height in a given storage space. By gripping the roll from the interior, liability of damage by the gripping device to the paper on the exterior of the roll is eliminated.

While I have hereinbefore described the device as used for hoisting rolls of paper, I do not intend thereby to limit the device to such use. Minor changes in the construction of the device may also be made without departing from the spirit and scope of my invention. I therefore do not wish to be limited to the exact details herein shown and described.

I claim as my invention:

1. A device for gripping an object from its interior, comprising a member having wedging surfaces thereon, a hollow body surrounding a portion of and slidable on said member; gripping jaws carried by said body adjacent said wedging surfaces, whereby relative movement of said member and said body will force said jaws outwardly into gripping engagement with the interior of said object; and a lever connected at one point to said member and at another point to said hollow body for moving said body with reference to said member.

2. A gripping device comprising a rod having attaching means at one end; a hollow body slidably mounted upon the other end of said rod, the last mentioned end of said rod having wedging surfaces thereon; a plurality of gripping jaws mounted in openings in said body; and a rib and groove connection between said gripping jaws and said wedging surfaces whereby a movement of said body longitudinally of said rod will carry said jaws inwardly or outwardly.

3. A gripping device comprising a rod having attaching means at one end; a hollow body slidably mounted upon the other end of said rod, the last mentioned end of said rod having wedging surfaces thereon; a plurality of gripping jaws mounted in openings in said body; a rib and groove connection between said gripping jaws and said wedging surfaces whereby a movement of said body longitudinally of said rod will carry said jaws inwardly or outwardly; and a lever pivotally connected with said body and said rod for sliding said body longitudinally of said rod.

4. A gripping device comprising a rod; an attaching member having a universal connection with the upper end of said rod; a body slidably mounted upon the lower end of said rod, said rod having wedging surfaces thereon; jaws carried by said body and adapted to be moved in one direction by said wedging surfaces; a sliding connection between said jaws and said rod for moving the jaws in the opposite direction; and a lever attached to said rod and said body for moving said body longitudinally of said rod to operate said jaws.

5. A gripping device comprising a sleeve; a tapered plug threaded in the lower end of said sleeve; an annular plug threaded in the upper end of said sleeve; a rod slidably mounted in said annular plug, one end of said rod lying within said sleeve and having wedging surfaces thereon; jaws mounted in openings in said sleeve, and having tongue and groove connections with said wedging surfaces; and a lever connected with said sleeve and said rod for moving said sleeve longitudinally of said rod.

6. A gripping device for hoists, comprising a rod; a cable-attaching member having a universal connection with the upper end of said rod; a body slidably mounted upon the lower end of said rod, said rod having wedging surfaces thereon; jaws carried by said body and adapted to be moved in one direction by said wedging surfaces; a sliding connection between said jaws and said rod for moving the jaws in the opposite direction; and manually-operable means attached to said rod and said body for moving said body longitudinally of said rod to operate said jaws.

In testimony whereof I affix my signature in presence of two witnesses.

ERNST R. RICHARDS.

Witnesses:
  E. LENNOX,
  WM. PETTIGREW.